(No Model.)
R. LUCKENBACH.
TOY.
No. 560,728. Patented May 26, 1896.
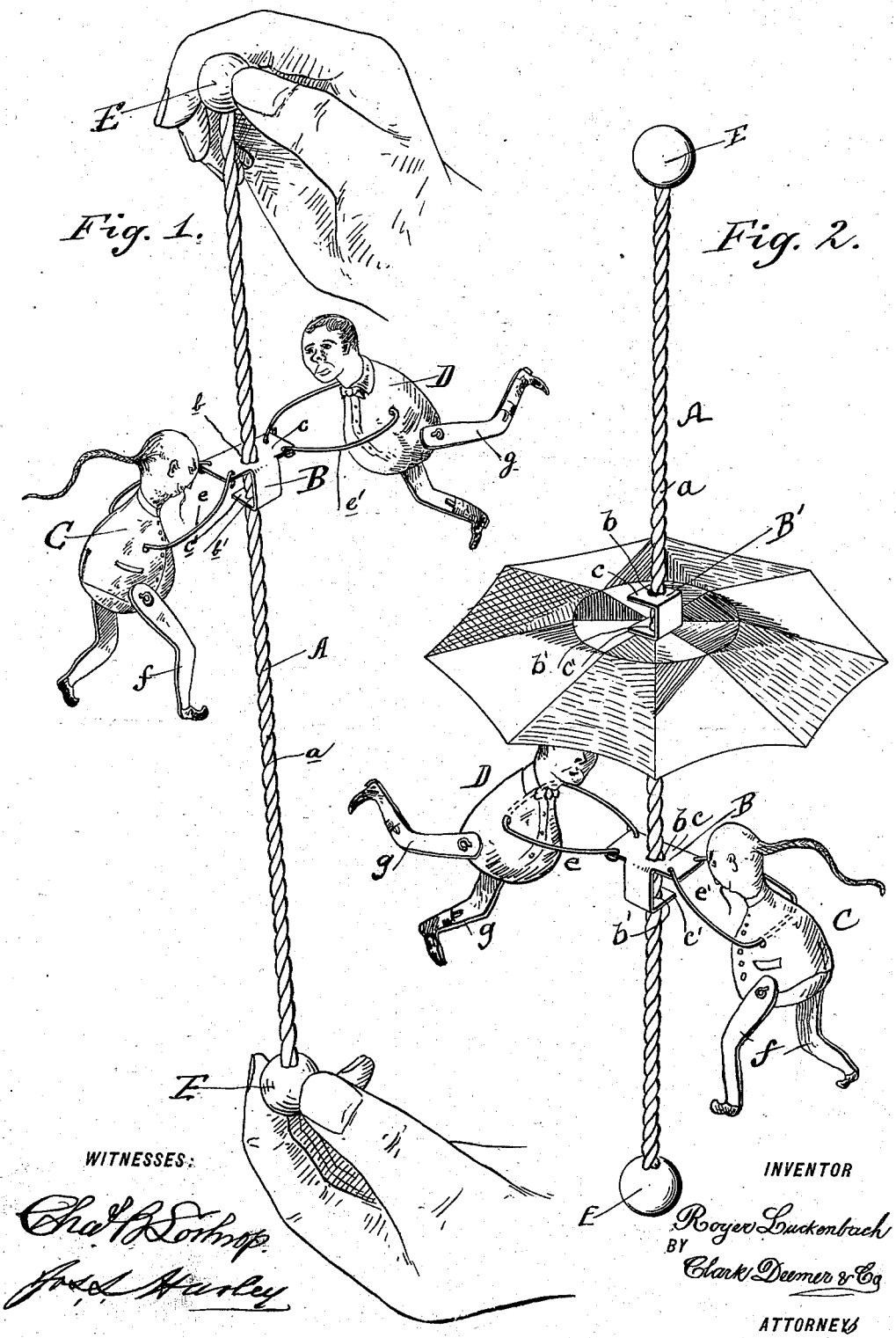
WITNESSES:
INVENTOR
Royer Luckenbach
BY
Clark Deemer & Co
ATTORNEYS

UNITED STATES PATENT OFFICE.

ROYER LUCKENBACH, OF PHILADELPHIA, PENNSYLVANIA, ASSIGNOR TO CLANMAR P. HOSKINS, OF SAME PLACE.

TOY.

SPECIFICATION forming part of Letters Patent No. 560,728, dated May 26, 1896.

Application filed May 21, 1895. Serial No. 550,045. (No model.)

*To all whom it may concern:*

Be it known that I, ROYER LUCKENBACH, a citizen of the United States, and a resident of Philadelphia, in the State of Pennsylvania, have invented a certain new and useful Improvement in Toys, of which the following is a specification, reference being had to the accompanying drawings, forming a part thereof, in which similar letters of reference indicate corresponding parts.

My invention relates to improvements in toys, and has for its object to produce an article of this character which will be inexpensive, easily operated, and amusing.

The invention will be hereinafter fully described and claimed, and illustrated in the accompanying drawings, in which—

Figure 1 is a perspective view showing the operation of my device, and Fig. 2 a similar view showing an auxiliary attachment thereto.

In constructing my invention a rod A is provided with a screw-thread $a$ throughout its entire length, which thread is adapted to engage with a nut B. This said nut is preferably formed by stamping out of a piece of sheet metal an approximately T-shaped blank, having holes or female threads $b$ and $b'$ therethrough adapted to engage with the thread $a$ of the said rod A. In practice the portions $c$ and $c'$ of the said blank are bent at right angles to its vertical portion in such a manner as to bring the openings $b$ and $b'$ thereof in vertical alinement with each other, whereby accurate engagement with the rod A is assured. To the said nut B upon each end of the portion $c$ thereof are attached grotesque figures C and D, the arms of these figures being formed by bending pieces of wire into the shape of staples $e$ and $e'$. These staples extend through the bodies of the figures C and D, and their projecting prongs or arms are rigidly attached to the four corners of the portion $c$ of the nut B in order that they may be constantly maintained in a horizontal position or at right angles to the rod A when it is held at an angle, as shown in Fig. 1 of the drawings.

The figures C and D swing loosely upon the staples $e$ and $e'$ and, owing to the weight of their lower portions, normally maintain a vertical position or a position at right angles to the arms; but when the device is being operated centrifugal force will cause them to assume positions approximating those shown in the drawings.

The figures C and D are provided with pivoted legs $f$ and $g$, which swing back and forth in a very amusing and lifelike manner when the device is being operated.

In order to prevent the nut B and its attached figures from leaving the rod A when the device is being operated, buttons E are provided and attached to each end thereof, which said buttons can be removed when it is desired to detach the said nut B and its figures.

To still further enhance the attractiveness of my toy, a revolving disk may be provided, which is preferably formed in the shape of an umbrella, as shown in Fig. 2. Its sections may be formed of different-colored material, and a rainbow effect will be produced when it is in operation. This said umbrella or disk will be provided with a nut B', adapted to engage with the rod A in a manner similar to that described in connection with the before-mentioned nut B.

To operate the toy, the rod A must be held in a vertical or nearly vertical position, when the nut B and the nut B' and their attached figures will by force of gravity travel downwardly, and, owing to the spiral contour of said rod with which they engage, a revolving motion will be given them. They will continue to revolve until one of the buttons F is reached, when it is only necessary to invert the rod to again start the figures upon a downward and revoluble course, the figures, owing to the weight of their lower portions, always assuming an upright or nearly upright position.

In the drawings I have shown the figures in the shape of brownies, but it will be obvious that different kinds of figures may be used under the scope of my invention.

Having thus described my invention, what I claim as new, and desire to secure by Letters Patent, is—

1. A toy comprising a spiral rod having a vertically movable and revoluble nut in engagement therewith, said nut being approximately U-shaped and having on one arm thereof projections, to which projections are rigidly attached the two ends of staple-shaped wires, which wires extend through the upper portion of the bodies of figures representing brownies or other fantastic objects, whereby said brownies or other objects are normally maintained in a vertical position; substantially as shown and described.

2. In a toy, the combination of a threaded rod having stops at either end thereof, and a vertically-movable revoluble nut thereon, said nut being approximately U-shaped, and having extended portions on one arm thereof, to which portions are rigidly attached staples, said staples adapted to form the arms of fantastic figures, which figures loosely revolve on said staples and are maintained in a normally vertical position; substantially as shown and described.

In testimony that I claim the foregoing as my invention I have signed my name, in presence of two witnesses, this 20th day of May, 1895.

ROYER LUCKENBACH.

Witnesses:
CHAS. B. LOTHROP,
M. G. MCCLAIN.